No. 793,893.

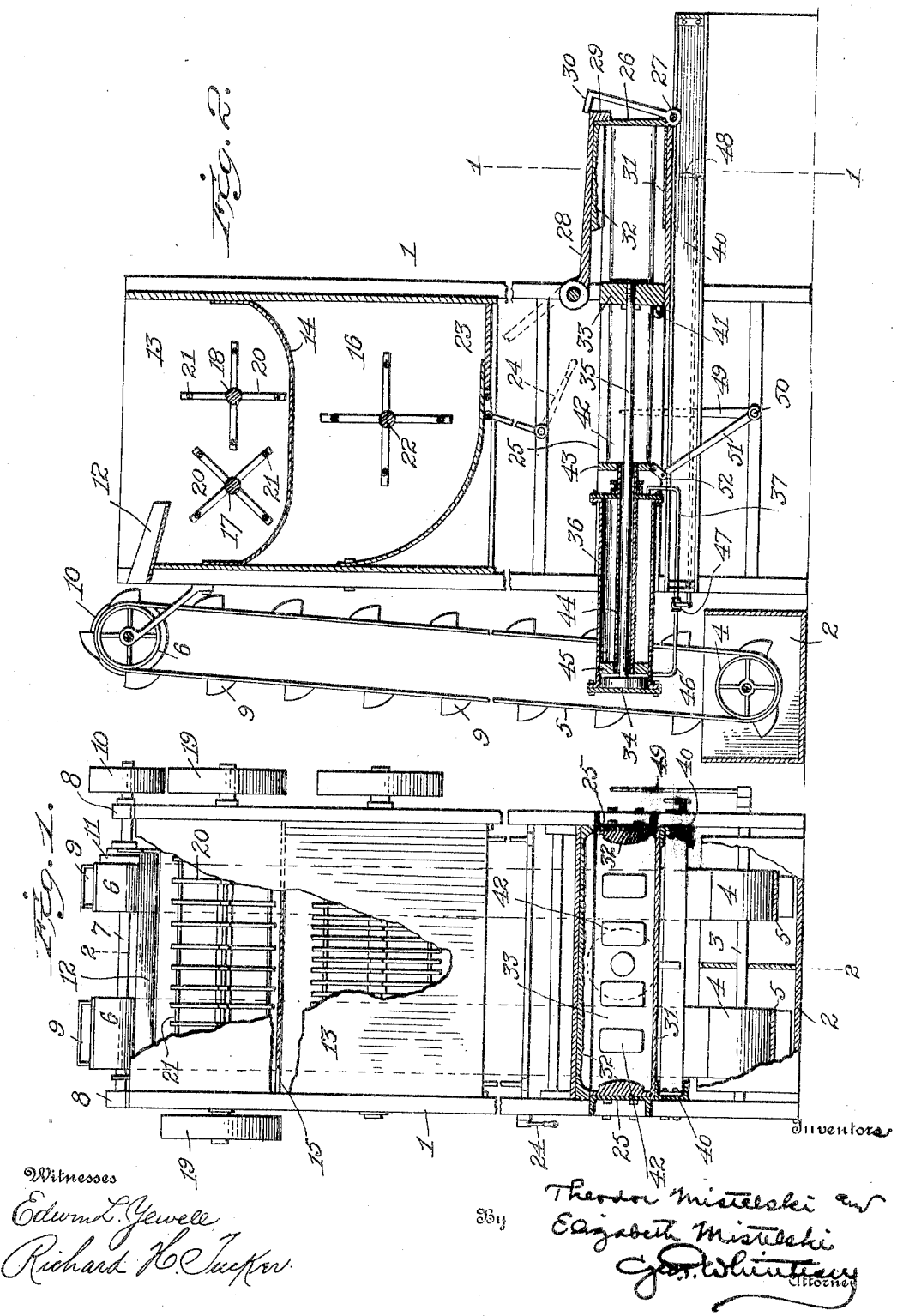

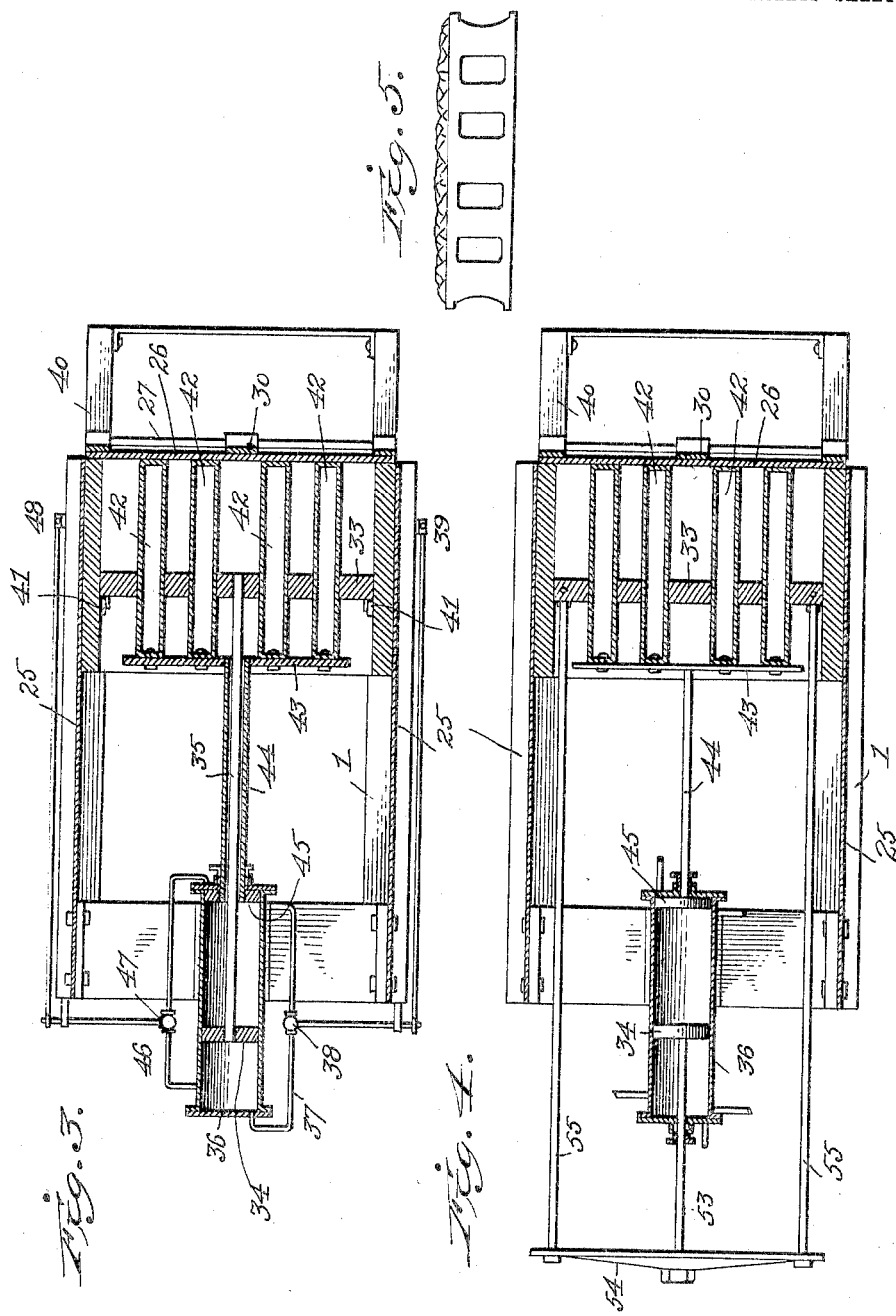

Patented July 4, 1905.

UNITED STATES PATENT OFFICE.

ELIZABETH MISTELSKI AND THEODOR MISTELSKI, OF ALLIANCE, OHIO.

MACHINE FOR MOLDING CONCRETE BLOCKS.

SPECIFICATION forming part of Letters Patent No. 793,893, dated July 4, 1905.

Application filed November 26, 1904. Serial No. 234,338.

*To all whom it may concern:*

Be it known that we, ELIZABETH MISTELSKI and THEODOR MISTELSKI, citizens of the United States, residing at Alliance, in the county of Stark and State of Ohio, have invented new and useful Improvements in Machines for Molding Concrete Blocks, of which the following is a specification.

This invention relates to machines for molding building-blocks, artificial stone, and the like from concrete or other suitable material.

It has special reference to those machines which are operated by power and in which the ingredients are automatically conveyed in the desired proportions to a hopper, mixed thoroughly, fed into the mold, there compressed into the desired shape, and finally delivered in condition to be carried away.

The object of the invention is to provide a machine which will dispense with manual labor as much as possible, increase the output, decrease the cost, and make blocks of a superior quality.

The invention consists in an organized machine comprising a trough having separate compartments for the several ingredients, endless-belt conveyers to lift the ingredients to the top of the machine and discharge them into a hopper, rotating mixers to thoroughly stir the ingredients together and produce a homogeneous concrete, a gate or door to allow a charge of concrete to pass down into a mold, movable core-blocks to enter the mold and produce the customary holes in the building-block, a compressor or ram for subjecting the concrete to heavy pressure in the mold and then when the mold is opened to eject the block upon a table or other receiver.

In the accompanying drawings, Figure 1 is a front elevation of the machine, partly in section, on the line 1 1, Fig. 2. Fig. 2 is a longitudinal vertical section on the line 2 2, Fig. 1. Fig. 3 is a sectional plan view of the mold and compressor. Fig. 4 is a similar view of a modification. Fig. 5 is an edge view of a building-block as made by this machine.

The working parts of the machine are supported on a frame 1, and at some convenient point near by is a trough 2, containing compartments for the sand, gravel, cement, or other ingredients for the concrete. A shaft 3 extends across the trough and supports a pulley 4 in each compartment. Endless belts or chains 5 pass around these pulleys and run over pulleys 6 on a shaft 7, supported in bearings 8, near the top of the machine. The belts are provided with buckets 9, by means of which material placed in the trough can be elevated to the top of the machine. The shaft 7 is provided with a driving-pulley 10, and one or more of the pulleys 6 are fastened to the shaft. One or more of them, however, may be loose and provided with a cone or stepped pulley 11 to receive a separate driving-belt, so that the speed of the conveyer running over that pulley can be varied in order to vary the relative quantities of the ingredients of the concrete.

At the delivery-point of the buckets is a spout 12, which directs the ingredients into the hopper 13. A short distance below the top of the hopper is a pan 14, made, preferably, of sheet metal and dished, as shown. The edges of the pan are fastened to the sides of the hopper; but at each side they have an opening 15, through which the mixed material can escape into the chamber 16 below. Two shafts 17 18 extend across the hopper above the pan and are journaled in suitable bearings in the frame. Means for driving the shafts are provided, such as the pulleys 19. On each shaft is a series of radial arms 20, preferably connected at their outer ends by bars 21. As the shafts rotate these arms and bars thoroughly stir and cut the concrete. Another stirrer is located in the chamber 16, consisting of a transverse shaft 22, provided with arms and bars like those on the shafts 17 18. In the bottom of the chamber 16 is an opening controlled by a sliding gate or door 23, which can be operated by a lever 24.

The mold is a box having stationary sides 25. The front end 26 is secured to a transverse shaft 27, so that it can be turned down out of the way when the block is to be ejected. The top 28 also is hinged, so that it can be opened to admit the concrete. When thus opened and turned back, the top 28 affords an inclined plane or chute down which the concrete can slide from the chamber 16 when the gate 23 is drawn back, as indicated by the dotted lines in Fig. 2. The top has a flange 29, which shuts down over the edge of the front end 26 to fasten it in place. One or more strong hooks or clamps 30 are arranged to engage with the top to hold it down and resist the expansive action of the concrete when it is put under pressure. The mold is provided with a loose bottom 31, which is removed with the finished block. The sides and top of the mold are provided with removable liners 32, which can be changed at will to give the desired shape and ornamentation to the block. The back end of the mold is composed of a movable head or ram 33, which is capable of longitudinal movement in the mold in order to compress the concrete placed therein. This ram is preferably actuated by a piston 34, connected with said ram by a rod 35, working in a cylinder 36, to which steam, compressed air, or water can be admitted through the pipes 37, controlled by a four-way cock 38. A handle 39 may be connected with said cock and located near the mold for the convenience of the operator. When the fluid-pressure is admitted behind the piston 34, the ram is forced forward to compress the concrete and finally to eject the block, as hereinafter described. When the cock is reversed, the fluid-pressure retracts the piston and the ram to the position shown in Fig. 2. The ram is supported at each side of the machine on the beams 40, forming part of the frame. If desired, the ram may be provided with rollers 41 to make it run more easily.

It is customary to form holes through concrete building-blocks to facilitate their drying and to lighten them and to form dead-air spaces when the blocks are built into a wall. In order to make these holes, we provide cores 42, preferably hollow tubes closed at the ends and attached to a core-plate 43, by means of which they can be run into the mold lengthwise of the same or withdrawn therefrom when necessary. The cores pass through holes in the ram 33, by which they are supported and guided in their movements. The core-plate is attached to a tubular rod 44, concentric with the rod 35 and secured to an annular piston 45, located in the cylinder 36 in front of the piston 34, the piston 45 being annular to permit the rod 35 to pass through it. By means of fluid-pressure admitted to one end or the other of the cylinder behind or in front of said piston 45 through pipes 46, controlled by a cock 47, the cores can be advanced into the mold or withdrawn therefrom. The cock 47 may be operated by a handle 48. In case fluid-pressure is not available or is not desired for actuating the cores they can be moved to and fro by a lever 49, attached to a transverse rock-shaft 50, having arms 51, connected by links 52 with the core-plate 43.

The operation is as follows: The sand, cement, and other ingredients are separately lifted by the conveyers and discharged into the pan, where the mixers soon mingle them intimately, a suitable supply of water being furnished in any desired manner. Passing down to the chamber 16 the auxiliary mixer there still further stirs the mass. The top of the mold is turned back to the dotted-line position, and sufficient concrete is admitted to fill the mold to the level of the bottom of the cores. Fluid-pressure is then admitted behind the piston 45, and the cores are advanced into the mold. More concrete is then run in until the cores are covered and the mold is filled. The top is then shut down and the hooks 30 turned up over it. Fluid-pressure is then admitted behind the piston 34, and the ram is forced forward, compressing the concrete and compelling it to enter every irregularity of the mold. The fluid-pressure is then turned off, and the mold is opened, its front end folding down to a level position and forming a table, upon which the block is then ejected by again admitting fluid-pressure behind the piston of the ram. The cores remain stationary, so that the ram acts to strip the block off them. The loose bottom 31 is ejected with the block and enables the latter to be carried away to a drying-floor.

If desired, chips of marble or granite or other stone can be scattered over the upper surface of the concrete in the mold before the top is closed, so that said chips will become firmly embedded in the block and form a face of the desired material. If a solid block is wanted, the cores are not advanced into the mold, but their front ends are kept flush with that of the ram, and thus an unbroken plane surface is presented to compress the block. By using different liners all sorts of ornamental shapes can be produced for copings, cornices, and the like. If necessary, one or both sides of the mold can be hinged or made removable to facilitate getting out special work.

In the modification shown in Fig. 4 the two piston-rods project through opposite ends of the cylinder, the rod 53, which extends to the rear, being attached to a cross-head 54, which is connected by rods 55 with the ram. This avoids the use of a tubular rod, as in the construction first described.

Having thus described our invention, what we claim is—

1. In a machine for molding concrete blocks, the combination with devices for mixing the concrete, of a mold located below said mixing devices, a hinged front end for said mold, and a hinged top for said mold forming a chute for the concrete when opened.

2. In a machine for molding concrete blocks, a mold having stationary sides, a hinged front end, a hinged top having a flange to shut down over the front end, a clamp for fastening said top, and a ram adapted to enter the rear end of said mold.

3. In a machine for molding concrete blocks, the combination with a mold having a hinged front end and a hinged top, of a fluid-pressure-actuated ram entering the rear end of said mold, core-blocks passing through holes in said ram, and means for moving said core-blocks.

4. In a machine for molding concrete blocks, the combination with a mold having a hinged front end and a hinged top, of a fluid-pressure-actuated ram entering the rear end of said mold, core-blocks passing through holes in said ram, a core-plate to which said blocks are attached, and a fluid-pressure device for actuating said plate.

5. In a machine for molding concrete blocks, the combination with a mold having a hinged front end and a hinged top, of a ram adapted to enter the rear of said mold, core-blocks passing through holes in said ram, a cylinder, two pistons in said cylinder, and rods connecting said pistons respectively with the ram and the core-blocks.

6. In a machine for molding concrete blocks, the combination with a mold having a hinged front end and a hinged top, of a ram adapted to enter the rear end of said mold, core-blocks passing through holes in said ram, a cylinder, two pistons in said cylinder, and rods connecting said pistons respectively with the ram and the core-blocks, and means for separately admitting fluid-pressure to actuate one or the other of said pistons at will.

7. In a machine for molding concrete blocks, the combination with a mold having stationary sides, a hinged front end and a hinged top, of a removable bottom, and removable liners secured to the inside of the mold.

8. In a machine for molding concrete blocks, the combination with a mold having an open bottom, of a ram entering one end of said mold and supported on the side beams of the frame of said machine, and a loose bottom for said mold adapted to be ejected by the ram with the finished block.

In testimony whereof we have signed our names to this specification in the presence of two subscribing witnesses.

ELIZABETH MISTELSKI.
THEODOR MISTELSKI.

Witnesses:
D. M. ARMSTRONG,
W. H. DRESSLER.